United States Patent [19]

Nice

[11] 4,407,865

[45] Oct. 4, 1983

[54] PROCESS FOR COATING A STERILIZING FILTER MATERIAL WITH SILVER AND PRODUCT FORMED THEREBY

[75] Inventor: Ralph A. Nice, Dublin, Calif.

[73] Assignee: Atlantic Richfield Company, Los Angeles, Calif.

[21] Appl. No.: 271,890

[22] Filed: Jun. 9, 1981

[51] Int. Cl.$^3$ ............................................. B05D 7/00
[52] U.S. Cl. .................................. 427/217; 210/501; 428/403; 428/404
[58] Field of Search ................ 427/217; 428/403, 404; 210/50

[56] References Cited

U.S. PATENT DOCUMENTS

| | | | |
|---|---|---|---|
| 2,424,085 | 7/1945 | Bergsteinsson | 427/217 |
| 2,459,896 | 1/1949 | Schwarz | 210/501 |
| 4,126,582 | 11/1978 | Diem | 252/476 |

FOREIGN PATENT DOCUMENTS

| | | | |
|---|---|---|---|
| 494902 | 7/1953 | Canada | 252/476 |
| 9004707 | 1/1974 | Japan | 427/217 |

*Primary Examiner*—Sam Silverberg
*Attorney, Agent, or Firm*—Robert M. Betz

[57] ABSTRACT

Processes are described for coating a particulate silver material such as sand or diatomaceous earth with metallic silver for sterilizing water and the like, the objective being to produce a highly adherent, thin layer of silver on the diatom surfaces. One method comprises mixing the filter particles with a silver compound in solution, then reducing the silver to elemental form on the particle surfaces by chemical, optical, or gaseous means with or without the addition of heat. Another method comprises sputtering elemental silver on to the diatom particle surfaces in a partial vacuum or inert atmosphere.

7 Claims, No Drawings

PROCESS FOR COATING A STERILIZING FILTER MATERIAL WITH SILVER AND PRODUCT FORMED THEREBY

BACKGROUND OF THE INVENTION AND PRIOR ART

Most of the heavy metals have long been known for their significant bactericidal effects, especially silver. There are references in ancient literature to the use of silver lined vessels being used to store drinking water because of the disease-free experiences of those who did. Physicians through the years since the days of Christ have used silver in treating human ailments, and modern science started recording work done on ascertaining silver's beneficial properties in disinfection in the 1800's. Silver's widespread use as a water disinfectant was initiated early in the 1900's and especially in the late 1920's and early 1930's. There exists much evidence giving support to the concept of using silver for its bactericidal effects. Further, its use in the treatment of drinking water supports the conclusion that no hazard to human beings will result from its use in concentrations much larger than necessary for bacteria control. There is today increasing understanding of the toxicological properties from chloridated hydrocarbons remaining in water following the application of chlorine, and of the ever-present irritations to human beings caused by a combination pH/chlorine phenomena. The need for a superior alternate to chlorine as a disinfectant in water is very significant.

When silver is used as a water disinfectant, the actual bacteria-killing agent is the silver ion. Silver metal releases this ion very slowly and thus a very large surface area is needed to impart a significant quantity of silver to anything approaching the volumes of water found in large bodies such as swimming pools. Some prior art processes using silver for disinfection of water employ very large surface area media, such as carbon or synthetic resins coated with silver, and arranged in a column or tube through which water to be treated must pass.

It is believed, however, that coating the granules of fine sand in a sand filter, or coating many of the diatom skeletons in a diatomaceous earth is a far superior way of achieving the surface area requirement. Coating of sand or diatomaceous earth with silver to produce a sterilizing filter for water supplies, swimming pools and the like is known in the prior art. It is also known that the impregnation of such material with silver should be carried out under conditions which produce a uniform distribution of the impregnating material. An example of this teaching is set forth in U.S. Pat. No. 1,473,331 to Bechhold. Bechhold describes a filter material such as diatomaceous earth which may be impregnated with silver by soaking in a solution of silver nitrate, after which the product is dried and treated in various ways in order to fix the resultant silver coating. The patent recognizes that the impregnation should be carried out under conditions which insure uniform distribution of the impregnating material and suggests the use of heat for this purpose. However, the patent stops short of any discussion of the desired temperature environment other than to imply that it should be sufficient to reduce a metallic compound coating into elemental form. Other patents considered by Applicants in this regard include the following: U.S. Pat. Nos.: 1,557,234; 1,685,204; 2,167,225, 3,257,315; 3,168,444; 3,372,808; Japanese Patent Application No. 14338/1977, filed Dec. 1, 1977, published on June 26, 1979.

It is well known that to disinfect a given unit weight of water with a silver coated filter material, it is not the thickness of the silver layer itself which is essential but the total of the silver coated surfaces of all the particles of the material in contact with the water. It is applicants' conviction that in the prior art, despite its familiarity with the use of silver as a sterilizing filter agent, and in particular the use of this metal to coat diatomaceous earth filters, insufficient attention has been directed to maximizing the efficient deposition of elemental silver on the individual particle surfaces of such filters, or to analyzing the mechanism whereby this occurs.

It is therefore, a general object of this invention to provide an improved sterilizing filter material and process for making the same.

It is a more particular object of this invention to provide an improved filter composed of sand or diatomaceous earth which enables the coating thereon of a substantially uniform layer of elemental silver to enhance the effectiveness of transmission of such silver to a surrounding body of water.

SUMMARY OF THE INVENTION

In accordance with a preferred embodiment of the invention, a process is described for coating a sand or diatomaceous earth filter with silver which includes the steps of (1) immersing the filter material in a solution of silver nitrate or similar chemical so as to thoroughly wet the surfaces of the individual filter particles, (2) adding a chemical reducing agent to the solution, causing elemental silver to plate out on the particle surfaces, and (3) washing and rinsing the resultant product. An alternate embodiment of this invention involves the steps of (1) soaking the filter material in a silver compound solution (2) subjecting the product to ultraviolet or visible light or to a stream of reducing gas to cause plating of elemental silver on the particle surfaces. Any of the above processes may optionally include the additional step of heating the silver coated product to enhance the adherence and bonding of the coating. A still further process includes placing the filter material in a partial vacuum or inert atmosphere and applying a silver coating by sputtering.

The invention also comprises a filter material of particulate matter with a uniform very thin or molecular coating of silver on all or a substantial portion of the particle surfaces produced as described.

DESCRIPTION OF THE PREFERRED EMBODIMENTS

In accordance with a preferred embodiment of this invention, a process for coating a filter material such as sand or diatomaceous earth with a thin film of elemental silver comprises steps as described hereafter.

The filter material is immersed in a solution of silver nitrate or a similar soluble chemical, preferably using de-ionized water as the solvent. A chemical reducing agent, such as glucose or other reducing sugar is then added to the solution, causing silver to plate out on the diatom surfaces. Plating will of course also occur on in the surfaces of the containing vessel, but this silver may easily be recovered for further use. The coated product is then filtered and washed, leaving a thin uniform silver coating on the particles. If desired, this layer can be rendered more adherent by heating the product to a sintering temperature, preferably between 600° C. and 800° C., or at any rate well below the melting temperature of silver which is 961.63° C. The above process is an improvement over any prior art process which relies solely upon heat as the reducing agent. The reason is that, using heat alone for this purpose, as the silver solution dries it forms crystals which in turn tend to resolve into globules of silver, rather than a thin flat layer, which is the desired end product. By contrast, chemical reduction produces a silver coating of substantially uniform thickness. Heating thereafter does not involve crystal formation.

In a first alternate reduction-type process in accordance with this invention, the filter material is soaked or wetted in a silver compound solution sufficiently to thoroughly wet the product. While in this wetted state, the product is subjected to a stream of gas capable of reducing the silver compound coating, again, leaving an elemental silver coating. Those skilled in this art will have no difficulty in determining the types of gases adapted for this purpose.

A still further alternate reduction-type process is the same as the above alternate, except that reduction to elemental silver takes place by applying an environment of ultraviolet or visible light to the silver compound coated product. Light is of course well-known as a means of decomposing silver nitrate such as in the silvering of mirrors. The light could, for example, be focused on a falling stream of diatomaceous earth fed from a moving belt.

In any of the above described methods, a final heating step may be applied for maximum fixing and coating adherence. Heating as described in this application can be in a conventional oven, but it may prove advantageous to use a microwave technique or to utilize the precise control of induction heating.

A final non reduction-type process in accordance with this invention constitutes placing the material to be coated in a vacuum, or partial vacuum with an inert atmosphere. Then by known techniques, a heated silver rod may be used to sputter a very thin layer of silver directly on the diatom surfaces. The individual silver atoms strike the diatom surfaces with such bonding effect as to completely eliminate the need for any final heating step. Furthermore, the resultant thickness of the silver coating can be controlled with great precision by timing the sputtering operation. Sputtering is of course a 37 line of sight" deposition method, so that hidden crevices of individual diatom skeletons are likely to be missed. But this does not detract from the efficiency of this process. The completeness with which the skeletal surfaces are covered is not important. What is important is to have the maximum coated surface area of filter material available for contact with the water to be disinfected, for any given amount of silver. This is in turn dependent upon the uniformity, thinness and adherency of the coating.

As a new disinfection or sterilizing material, a filter produced in any of the ways described above constitutes an aspect of this invention in addition to the processes whereby it may be formed.

I claim:

1. The process for coating a sterilizing filter composed of a particulate material comprising the steps of:
   (a) immersing the filter material in a silver compound in solution,
   (b) applying a chemical reducing agent to said solution causing elemental silver to plate on the surface of said material as a thin coating,
   (c) filtering and washing said material, and
   (d) applying heat to said material at a sintering temperature to form a more adherent bond with said elemental silver coating.

2. The process for coating a sterilizing filter composed of a particulate material comprising the steps of:
   (a) soaking the filter material in a silver compound sufficiently thoroughly to wet a substantial portion of the surfaces thereof,
   (b) applying to said filter material a stream of gas adapted to reduce said silver compound in place as a thin coating on said material surfaces,
   (c) applying heat to said filter material at a sintering temperature to form a more adherent bond with said elemental silver coating.

3. The process for coating a sterilizing filter composed of a particulate material comprising:
   (a) soaking the filter material in a silver compound sufficiently thoroughly to wet a substantial portion of the surfaces thereof, and
   (b) subjecting said filter material to light radiation adapted to decompose said silver compound in place,
   (c) applying heat to said filter material at a sintering temperature to form a more adherent bond with said elemental silver coating.

4. The process as in claim 3 wherein said light is in the ultraviolet range.

5. The process as in claim 3 wherein said light is in the visible range.

6. The process for coating a sterilizing filter composed of a particulate material comprising the steps of:
   (a) placing said filter material in an at least partially evacuated environment, and
   (b) sputtering a thin coating of elemental silver on to the surfaces of said material,
   (c) applying heat to said material at a sintering temperature to form a more adherent bond with said elemental silver coating.

7. The process as in claim 6 wherein said environment contains an inert gas.

* * * * *